SCRAMBLED TELEVISION

Filed Aug. 25, 1954 2 Sheets-Sheet 1

INVENTOR
WILLIAM J. SHANAHAN
BY Cushman, Darby & Cushman
ATTORNEYS

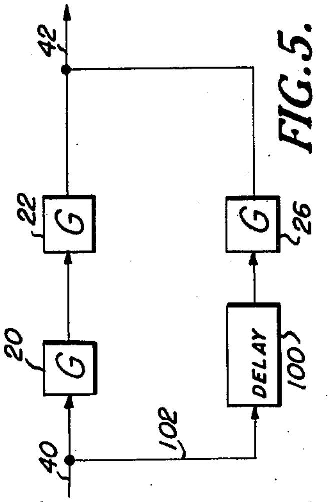
FIG. 5.
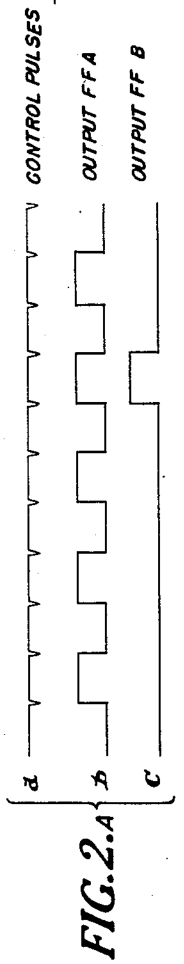
FIG. 2.A
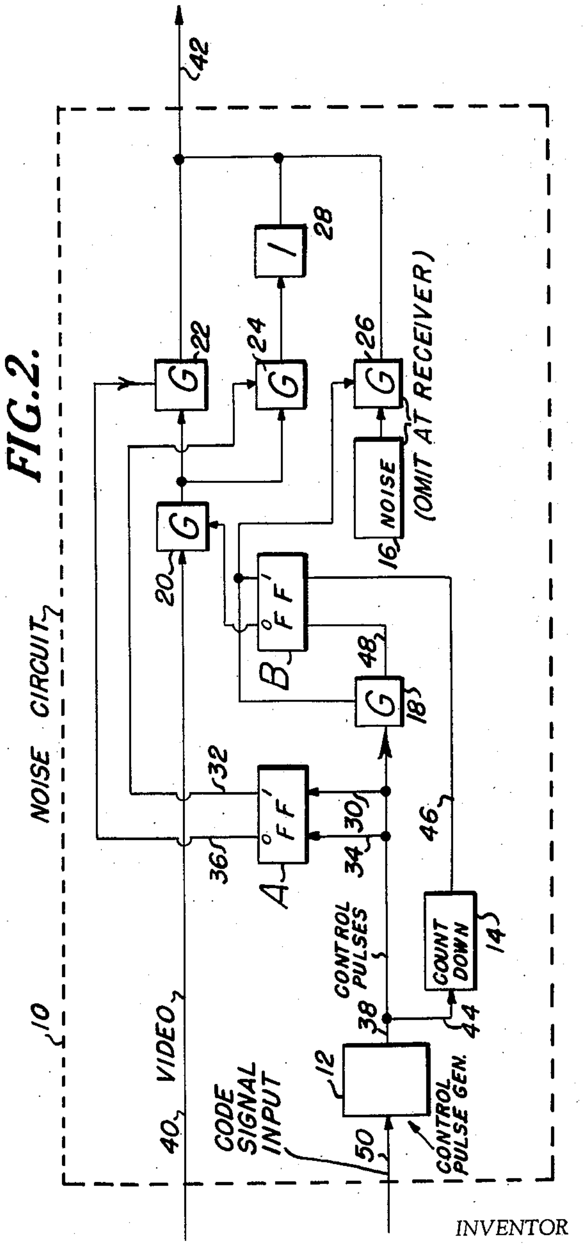
INVENTOR
WILLIAM J. SHANAHAN
BY Cushman, Darby & Cushman
ATTORNEYS 2,956,110

SCRAMBLED TELEVISION

William J. Shanahan, New York, N.Y., assignor to Skiatron Electronics & Television Corporation, New York, N.Y., a corporation of New York Filed Aug. 25, 1954, Ser. No. 452,095

2 Claims. (Cl. 178—5.1)

This invention relates to scrambled television transmission methods and systems, and transmitters and receivers therefor.

It has been proposed in the art to which this invention pertains to periodically invert the video signals as to blacks and whites and degrees thereof in relation to the modulation of the transmitted signal, to cause distortion in the display of an unauthorized receiver. This invention pertains particularly to such inversion of the video signals with the further provision of signals to prevent certain effects inherent in the human eyes from establishing at least a sense of the televised picture.

Basically, the present invention contemplates the periodic inversion of video signals together with the insertion of a spurious signal such as a noise signal at predetermined intervals, the arrangement being such that an unauthorized receiver, that is, one designed for normal television reception, will present a display so distorted as to be unrecognizable, while an authorized receiver will present an entirely satisfactory and undistorted picture.

Accordingly, it is a primary object of this invention to provide an improved television scrambling method, system and apparatus.

It is a further object of this invention to provide a method and apparatus whereby video signals in a television transmission may be periodically inverted and wherein spurious signals may be inserted into the transmission to completely distort the display of an unauthorized receiver.

Further objects and the entire scope of the invention will become more fully apparent from the hereinafter detailed description of illustrative embodiments of the invention, and from the appended claims.

The invention may be best understood with reference to the accompanying drawings which show illustrative embodiments and other descriptive matter as follows:

Figure 1 in parts *a* through *f* inclusive shows a vertical bar test pattern and accompanying radio frequency envelopes and detected waveforms of video signals and a spurious signal.

Figure 2 shows a circuit for applying spurious signals into a television transmission and inverting video at the transmitter, or reinverting video and suppressing spurious signals at the receiver end of a television system according to the present invention.

Figure 2A in parts *a* through *c* inclusive shows waveforms applicable to Figure 2.

Figure 5 shows a modification of the circuit of Figure 2.

Figure 1:
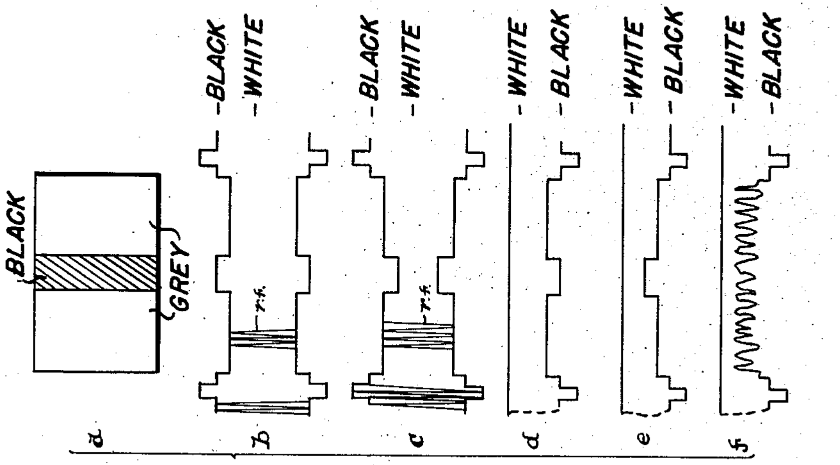

Part *a* of Figure 1 is intended to illustrate a test pattern on which a television camera may be trained, or the display of the test pattern on an authorized receiver tuned to receive the television transmission. The rectangle shown in this part of Figure 1 is intended to represent a grey background having a vertical black bar located centrally thereof. Part *b* of Figure 1 is intended to show the radio frequency carrier of the television transmission during a single line trace across the pattern of part *a*, the amplitude of the radio frequency showing the grey level and the black level, it being understood that the transmission is such that the black level is in the direction of the maximum signal amplitude and the white level near the minimum amplitude. Part *c* of Figure 1 shows the case for inverted video signals, the amplitude of the carrier frequency during the interval of the black bar in the pattern decreasing toward white instead of increasing toward black (the latter being shown in part *b*). Part *d* of Figure 1 shows the rectified radio carrier frequency of a transmission according to part *b*, and part *e* shows the rectified carrier signal according to transmission shown in part *c*. Part *f* of Figure 1 is intended to represent a detected video signal made up of a random or noise signal.

As has been suggested hereinabove, it is found that when video signals are regularly inverted, that is, inverted line for line, field for field, etc., the retentivity of the human eyes not merely tends to integrate out the blacks and white which are caused by a black object such as the black bar in the test pattern now being discussed, but actually tends to create a white bar. This is true because the human eye appears to be non-linear and is more responsive to increases in brightness than to decreases in brightness. Therefore, even the regular inversion of video will not serve to entirely obscure the picture. However, according to the present invention it has been found that when a spurious signal such as a noise signal is introduced to replace one in every so many lines or fields, satisfactory scrambling of the picture results.

It will be apparent that this invention includes situations where the video may be permitted to remain in one condition longer than in the inverted condition. However, a preponderance of video signal in one condition will further serve to show the picture in that condition. Therefore, the best mode of operation is thought to be the regular inversion of video line for line, frame for frame, etc. Additionally, it is believed to be a preferred mode of operation to invert video at least line for line, rather than field for field or longer periods of time.

It is thought to be apparent that where a transmission is created according to the above described method, an unauthorized television receiver having no means therein for inversion of the video or cancellation of lines of noise, will show on the display device, in the example of line for line inversion, a picture which is somewhat cancelled-out to show a grey level, but with one of every *n* lines, say every sixth line, a noise or random signal which serves to obscure the picture which the eyes may tend to reconstruct due to the non-linear characteristics discussed above.

It is necessary that authorized receivers be equipped to reinvert the inverted signals as required, and eliminate the spurious lines so as to properly reconstruct the picture. Apparatus for use at the transmitting station and each receiver will now be described for this purpose. For convenience in the hereafter appearing description the signals otherwise referred to as spurious signals, random signals, or noise signals will be referred to simply as noise signals, but without limitation thereto. The term spurious is employed in the claims as a generic expression.

Referring to Figure 2 a noise circuit 10 is illustrated, this including a control pulse generating circuit 12, flip-flop circuits A and B, a count-down circuit 14, a noise source circuit 16, gate circuits 18, 20, 22, 24 and 26, and a signal inversion circuit 28.

The flip-flop circuits A and B may be conventional Eccles-Jordan type circuits having two inputs and two outputs and shiftable between two stable states so that in one stable state one of the output leads will carry a relatively high potential and the other output lead a relatively low potential, these potential conditions being reversed when the circuit is shifted to the other stable state. For example, the circuit A may be such that when a negative pulse is applied to the "1" input 30, a relatively high potential will appear on the 1 output line 32 (unless that condition previously existed). Assuming a shift to a relatively high potential on output line 32, a negative pulse on "0" input line 34 will change the potential on the 0 output line 36 from the relatively low to the relatively high potential. The gate circuits may include vacuum tubes having a number of control grids commensurate with the number of input lines, so that a desired change of potential on the output line exists only during the occurrence of input signals. Proper inversion circuits (not shown) are to be associated with each gate to insure proper functioning. The count-down circuit 14 may be any one of a number of well known counting circuits such as a series of interconnected flip-flop circuits. The noise source 16 may be any convenient source of random or regularly recurring signal. It is preferable in the practice of the present invention that the amplitude of the noise signal be at least as great as the peak to peak variations in the video signal.

The operation of Figure 2 may be best explained with the assumption that a series of regularly recurring control pulses exist on line 38 which forms the output of the control pulse generator 12. A plot of such regularly recurring pulses is shown in Figure 2A, line *a* thereof. These could be at the horizontal line pulse rate of the television system or some other rate. Line 38 is connected to both the 0 and the 1 input of flip-flop A and therefore each pulse will serve to shift the flip-flop, whereby the relative potentials on the 0 and the 1 output lines (lines 36 and 32, respectively) will shift between levels as shown in line *b* of Figure 2A, one waveform being shown for convenience for demonstrating the relative potentials on both lines. The 0 output of flip-flop A serves as one enabling input to gate 22 and the 1 output of flip-flop A serves as one enabling input to gate 24. When the flip-flop A is in its 1 state, gate 24 will be opened and when in its 0 state gate 22 will be opened.

Video signals are applied to line 40 and are passed through gate 20 and applied to gates 22 and 24. Video signals passing through gate 22 are applied to output line 42, while video signals passing through gate 24 are inverted in the inverter circuit 28 and then applied to line 42. Assuming that the control pulses on line 38 (line *a* of Figure 2A) occur at the horizontal line repetition rate, a first line of video signals will pass through gate 22 without inversion whenever this gate is opened by flip-flop A, and the next line of video signals will be inverted and appear on line 42 having passed through gate 24 which is opened while gate 22 is closed. Thus, video signals on line 42 are inverted at the horizontal line rate.

The flip-flop B has its 0 output connected as the enabling input to gate 20, and the 1 output is connected as the enabling input to gate 18 and also to gate 26. The control pulses on line 38 are applied over branch line 44 to the count-down circuit 14. Assuming that the count-down circuit 14 produces one output pulse for every eight input pulses, pulses at this rate are applied to the 1 input of flip-flop B over line 46. The shifting of flip-flop B to its 1 state serves to open gate 18 to permit the next occurring control pulse to pass therethrough and to be applied to the 0 input of flip-flop B over line 48. This pulse serves to shift flip-flop B to its 0 state. It will now be apparent that the voltage characteristics of the 1 and 0 outputs of flip-flop B are according to line *c* of Figure 2A. While the flip-flop B is in its 0 state (the 0 output having the high potential) gate 20 will be opened and the video signals will flow therethrough for application to gates 22 and 24. However, during the 1 control pulse period while the flip-flop B is shifted, all video signals will be blocked at gate 20, and gate 26 will be opened. Thus, for the particular line or other period of the control pulses, the spurious or noise signal from source 16 will be applied to output line 42.

A line 50 is shown as the input to control pulse generator circuit 12, this line carrying the code signal input. It is to be understood that the code signal input on line 50 may be one of a number of arrangements for determining the function of the exemplary so-called noise circuit 10. Elaborate systems have been described for periodically or randomly changing a code situation so as to impart a great number of independent codes into a scrambled television transmission system. For example, see my copending patent applications Serial No. 255,555, filed November 9, 1951; Serial No. 316,485, filed October 23, 1952; and Serial No. 418,642, filed March 25, 1954. The control signal input on line 50 in Figure 2 of this application could be the waveforms on lines 4–9 inclusive of Figure 2 of Serial No. 316,485, or the random or regularly recurring signals on the lines 68, 70 and 72 of Serial No. 418,642. The control pulse generating circuit 12 can be among other things a set of count-down circuits connected to a source of regular recurring pulses such as the horizontal driving pulses, the particular output of which is to be controlled by a set of gates, one connected to each count-down circuit and having enabling inputs determined from the code signal input lines 50 by means of a conversion matrix. Assuming that the first count-down circuit is in a ratio of 1 to 2, the next in the ratio of 1 to 4, the next in the ratio of 1 to 6, the recurrence rate of the control pulses (line *a* of Figure 2A) will be shifted from time to time, such as from field to field.

It will be further understood that the noise circuit 10 is intended to be illustrative only and the relative occurrence of the noise signals may be otherwise controlled, all within the scope of the present invention.

Figure 3:
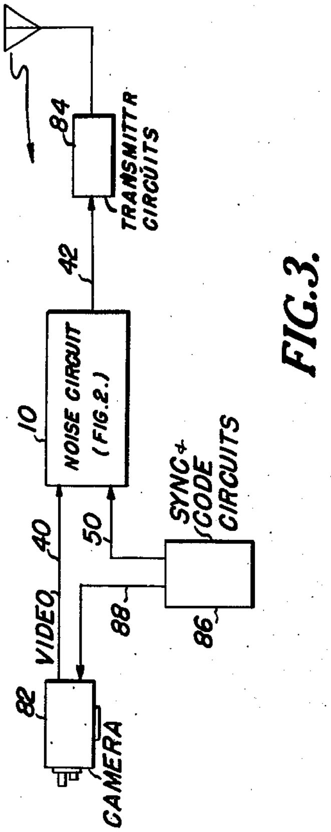
Figure 3 shows pertinent components of a television transmitter utilizing the circuit of Figure 2 according to the present invention.

Referring now to Figure 3, the transmitter equipment (exclusive of incidental components not necessary in the present description) may include a television camera 82, noise circuit 10, conventional transmission circuits 84 and synchronizing and code circuit 86. The video signals from the camera will be applied on previously mentioned line 40 to circuit 10 and the code signal input signals will be applied to circuit 10 over line 50. The synchronizing and code circuits 86 may include means for generating the conventional horizontal and vertical camera driving pulses to be applied to the camera over line 88 and also all of the code signal generating circuits as mentioned hereinabove, which may be according to those illustrative circuits in the above mentioned copending patent applications. The combined video and noise signals will be applied over line 42 to the transmission circuits 84.

Figure 4:
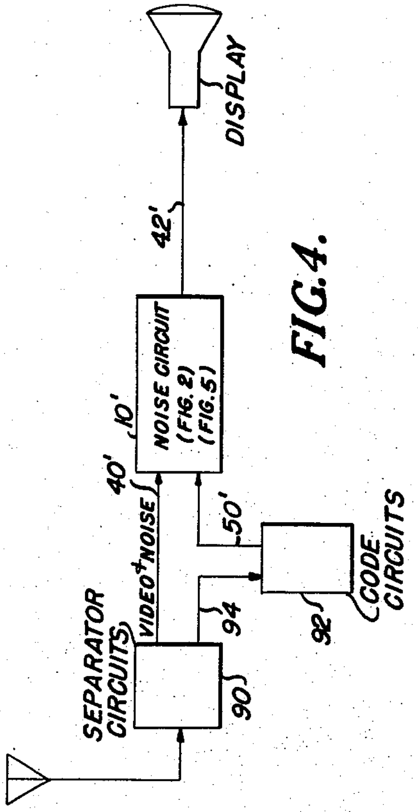
Figure 4 shows a television receiver according to the present invention equipped to receive transmissions from the transmitter of Figure 4 for unscrambled display.

A receiving circuit may be as shown in Figure 4 where signals received through the antenna are separated as is conventional in separator circuits 90, the video and noise signals applied to receiver noise circuit 10 over line 40′ and coding signals applied over line 50′ from receiver code circuits 92, the receiver horizontal and vertical driving pulses being applied thereto over line 94. An understanding of the above mentioned copending patent applications will serve to make clear that the receiver code circuits 92 are essentially the complement of whatever coding circuits are employed at the transmitter, the general requirement being that the transmitter and receiver circuits respectively have similar characteristics so as to maintain the display device of the authorized receiver in step with the changes in the radiated signals.

It may be thought that the elimination of one video line or another portion of the display will be annoying and deteriorate the quality of the display. Actually, particularly in the case of the elimination of non-video lines in a given number of lines such as six or eight lines, the effect is hardly noticeable (while a noise display at the same rate in an unauthorized receiver serves to satisfactorily scramble the picture). It is possible to go further to avoid distortion due to the elimination of the video by an arrangement such as shown in Figure 5. In this figure, in effect, the noise circuit 16 of Figure 2 is replaced by a delay line device 100 which continuously has video signals applied to the input over line 102. The output of the delay line device is applied to gate 26 which is thereafter connected to line 42 (the equivalent of line 42 at the transmitter). Whenever the flip-flop B is operated to close gate 20 and to, in effect, produce no video in the video display, the previous video, say for a video line, will be repeated through gate 26 by virtue of the delay in delay line 100. In the case where the video is being inverted at line repetition rate and the noise insertion is for the delay of one line in *n* lines, the delay of the device 100 is to be equal to one line. The application of this technique where the noise insertion is for more than one horizontal line, will be apparent, the delay time having only to be commensurate with the control pulse repetition rate.

The foregoing detailed description of illustrative embodiments of the invention has been given only for purposes of illustration, and the scope of the invention is to be determined from the appended claims.

What is claimed is:

1. In a scrambled television transmission system including a transmitting end and at least one receiving end, apparatus for scrambling the television transmission including means at the transmitting end for inverting the transmitted video signals at predetermined times, and means at the transmitting end for replacing the video signals during other predetermined times which are at least substantial portions of complete line trace times with spurious signals, the receiving end including means for reinverting video signals in synchronism with said inversion at said transmitting end, means for suppressing said spurious signals during the occurrence time thereof, and further including means at the receiving end for supplying the most recently available video signals in repetition to the display means of the receiver in lieu of said suppressed spurious signals.

2. Apparatus for receiving scrambled television transmissions in which the transmitted video signals are inverted at predetermined times and the video signals are replaced during other predetermined times with spurious signals intended to be predominantly displayed, including means for reinverting the video signals in synchronism with said inversion in the transmitted signals, means for suppressing said spurious signals during said other predetermined times, and further including means for supplying the most recently available video signals in repetition to the display means of the receiver in lieu of said suppressed spurious signals.

References Cited in the file of this patent

UNITED STATES PATENTS

| | | |
|---|---|---|
| 2,405,252 | Goldsmith | Aug. 6, 1946 |
| 2,414,101 | Hogan | Jan. 14, 1947 |
| 2,510,046 | Ellett et al. | May 30, 1950 |
| 2,645,677 | Young | July 14, 1953 |
| 2,691,060 | Roschke | Oct. 5, 1954 |
| 2,752,415 | Roschke | June 26, 1956 |

FOREIGN PATENTS

| | | |
|---|---|---|
| 1,034,776 | France | Apr. 15, 1953 |